F. MUMMELTHEY AND C. H. HOLMES.
APPARATUS FOR MAKING NUTS.
APPLICATION FILED MAY 27, 1915.

1,338,244.

Patented Apr. 27, 1920.
7 SHEETS—SHEET 2.

WITNESSES

INVENTORS

F. MUMMELTHEY AND C. H. HOLMES.
APPARATUS FOR MAKING NUTS.
APPLICATION FILED MAY 27, 1915.
1,338,244.
Patented Apr. 27, 1920.
7 SHEETS—SHEET 3.
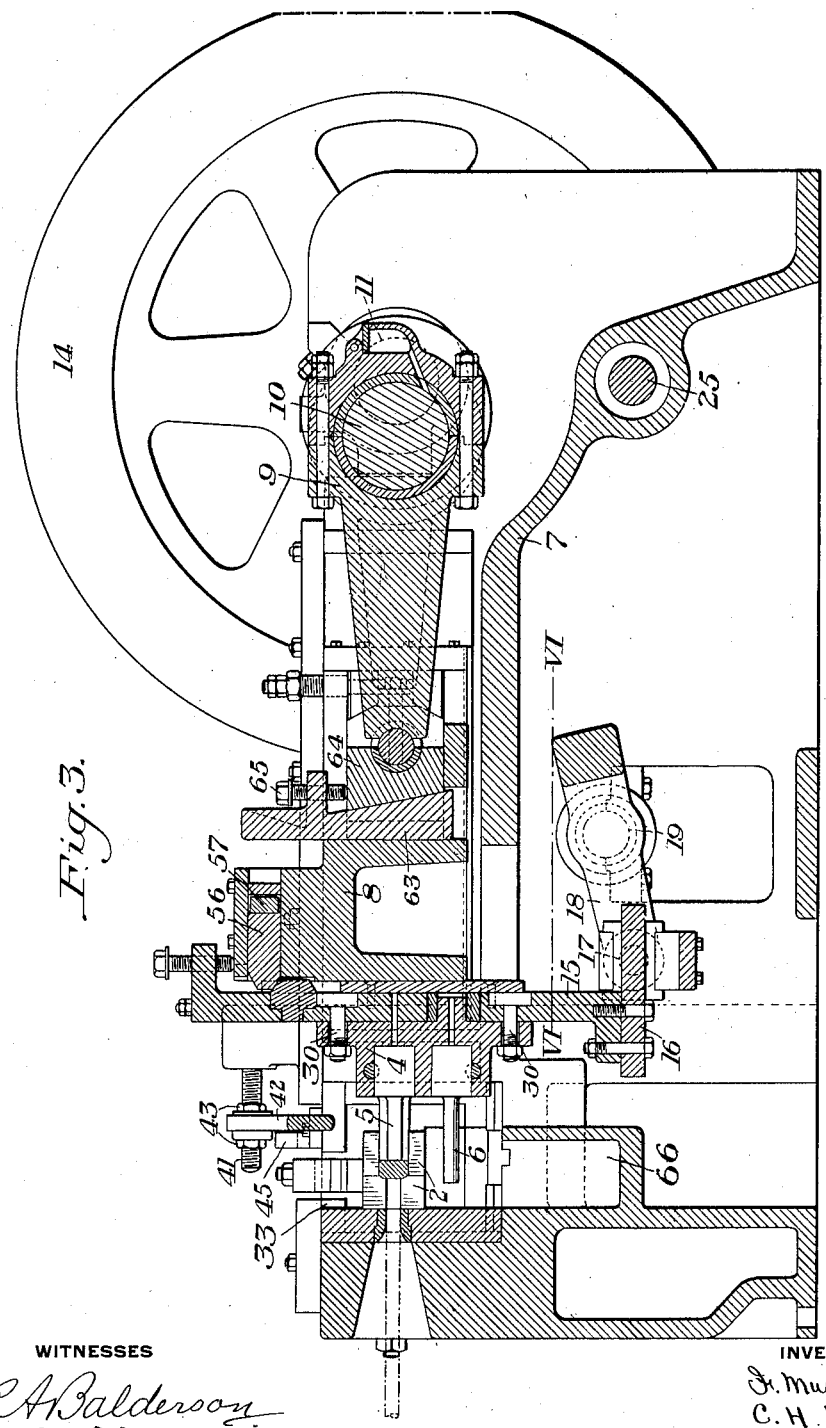
WITNESSES
INVENTORS

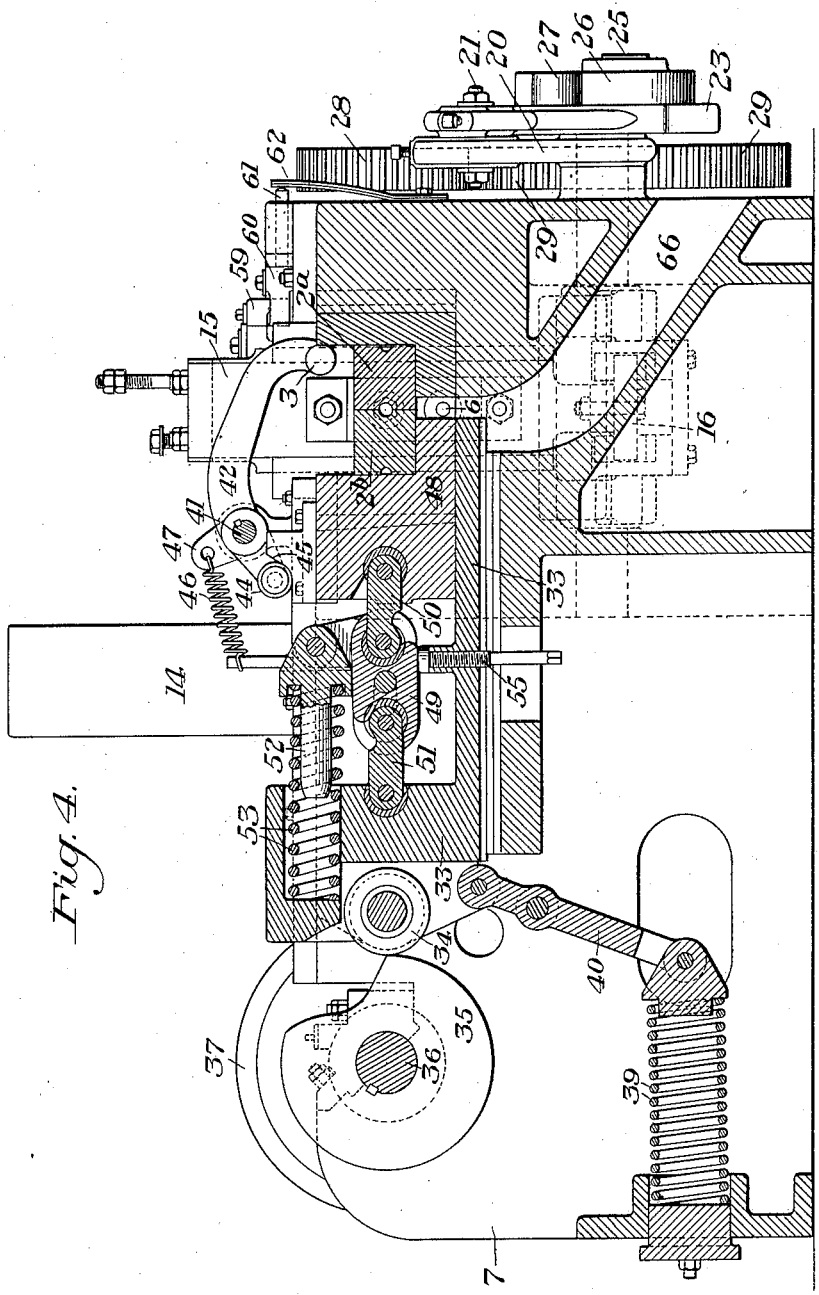

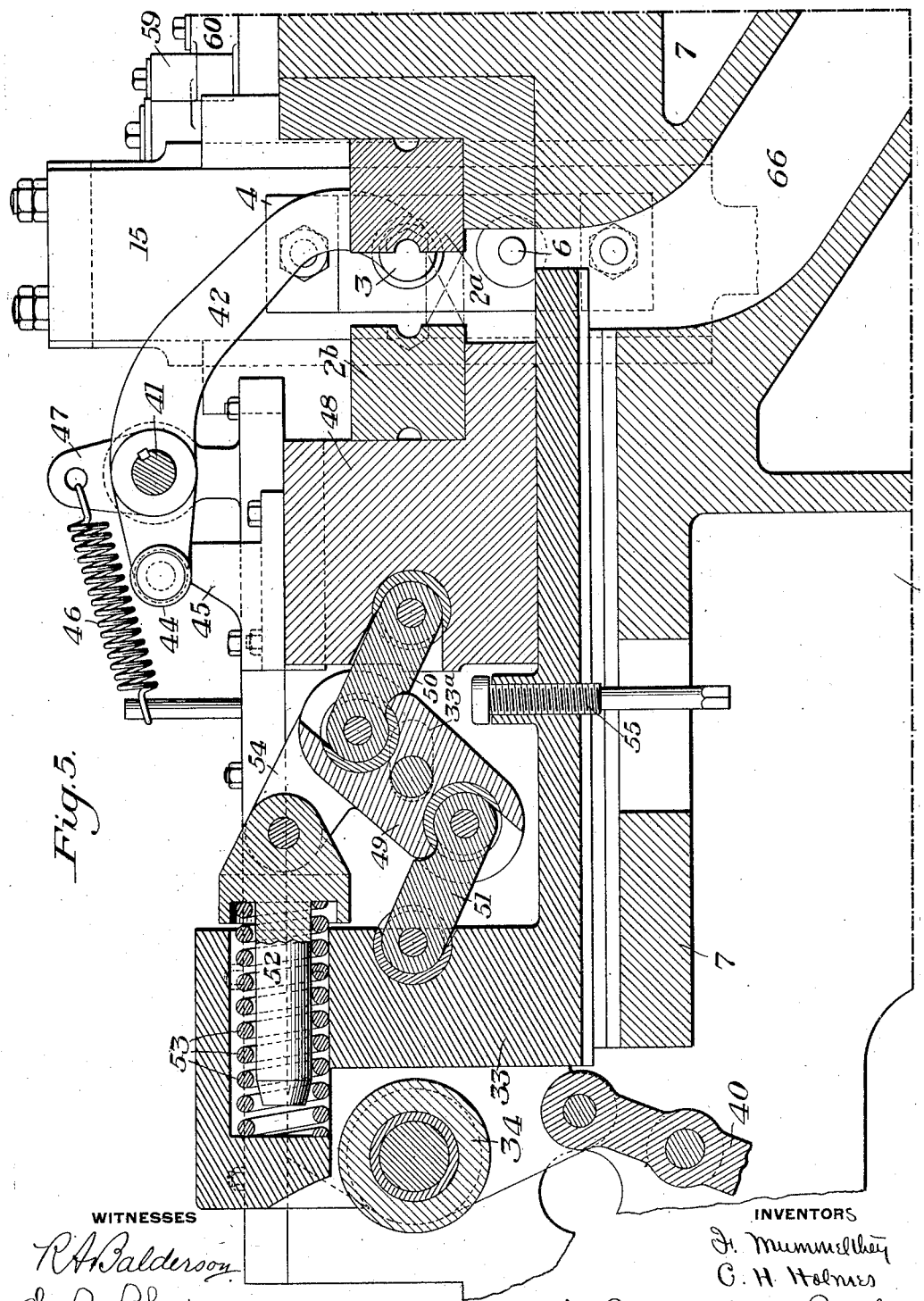

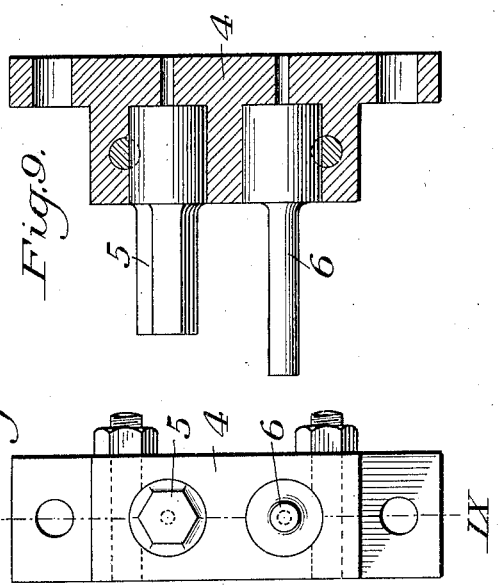
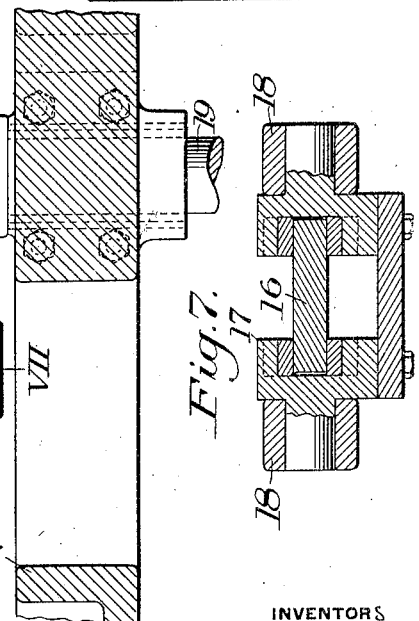
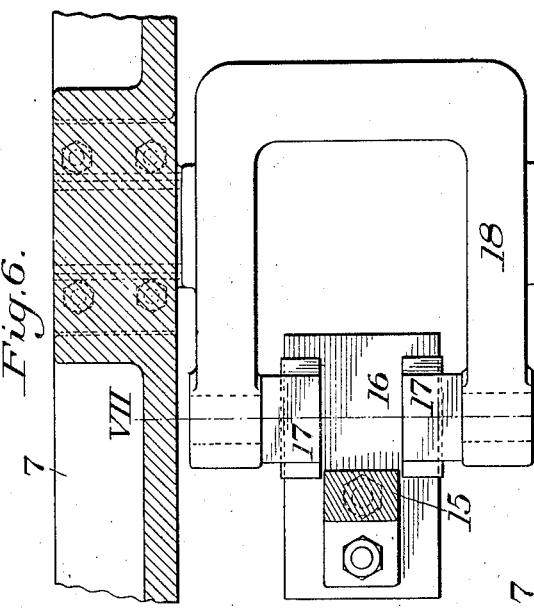

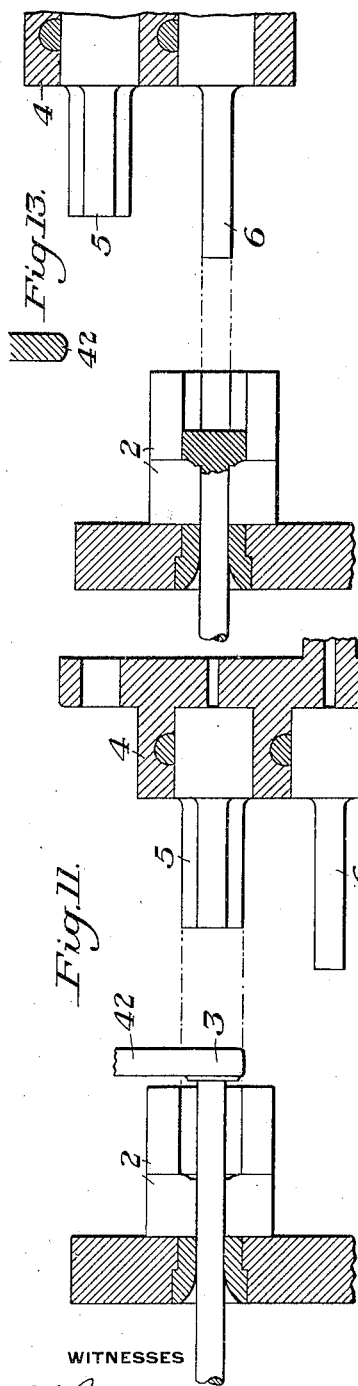
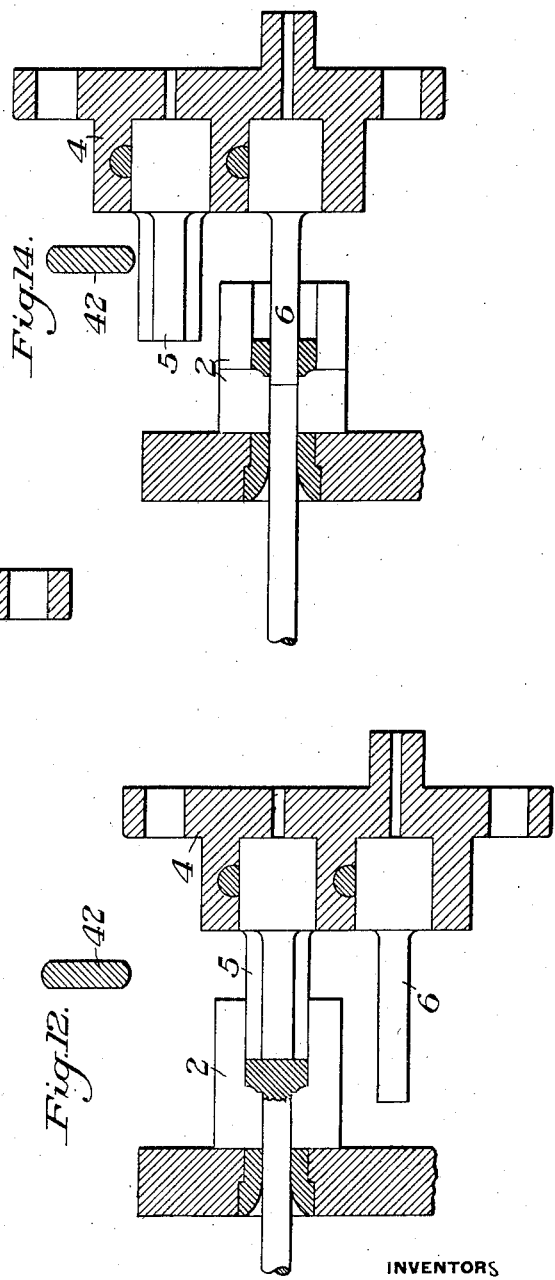

UNITED STATES PATENT OFFICE.

FERDINAND MUMMELTHEY AND CHESTER H. HOLMES, OF CORAOPOLIS, PENNSYLVANIA.

APPARATUS FOR MAKING NUTS.

1,338,244.  Specification of Letters Patent.  Patented Apr. 27, 1920.

Application filed May 27, 1915. Serial No. 30,755.

*To all whom it may concern:*

Be it known that we, FERDINAND MUMMELTHEY and CHESTER H. HOLMES, citizens of the United States, and residents of Coraopolis, Allegheny county, Pennsylvania, have invented a new and useful Improvement in Apparatus for Making Nuts, of which the following is a full, clear, and exact description, reference being had to the accompanying drawings, forming part of this specification, in which—

Figs. 3 and 4 are vertical sections on the lines III—III and IV—IV, respectively, of Fig. 1, in a slightly modified form.

Fig. 5 is a view similar to Fig. 4, of a portion of the mechanism shown therein and in which the safety device has been thrown into action to prevent breaking the parts if there is any obstruction between the two die members.

Fig. 6 is a detail sectional view of the tool holder slide and its actuating yoke.

Fig. 7 is a similar view on the line VII—VII of Fig. 6.

Fig. 8 is a front view of the upsetting and piercing tools and a holder therefor.

Fig. 9 is a sectional view on the line IX—IX of Fig. 8.

Fig. 10 is a detail sectional view of the relief mechanism shown in Figs. 4 and 5, and Figs. 11 to 14 are diagrams illustrating the various operations and positions of the upsetting and piercing tools with relation to the work piece.

Figure 1:
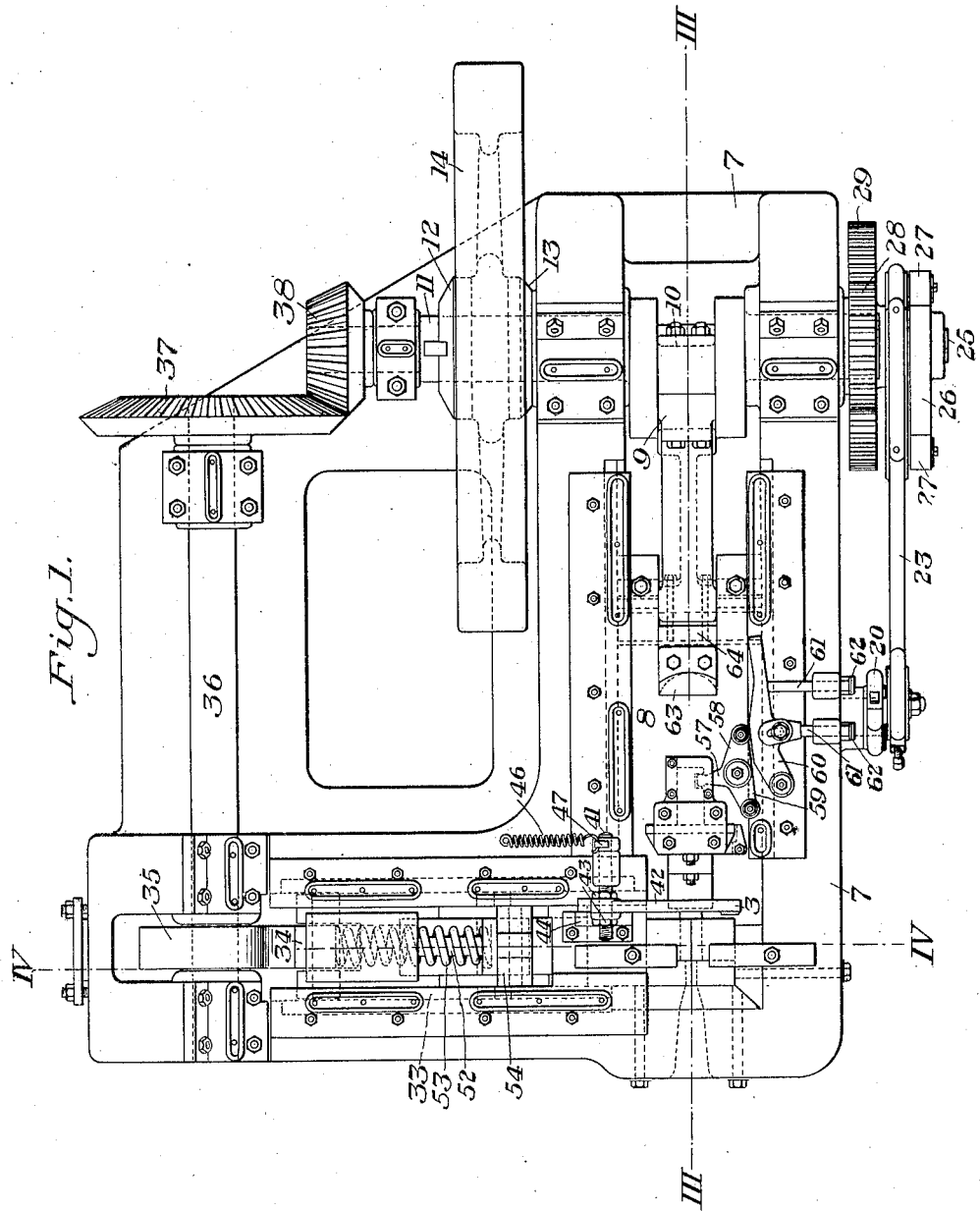
Figure 1 is a plan view of one type of apparatus for carrying out our invention.
Figure 2:
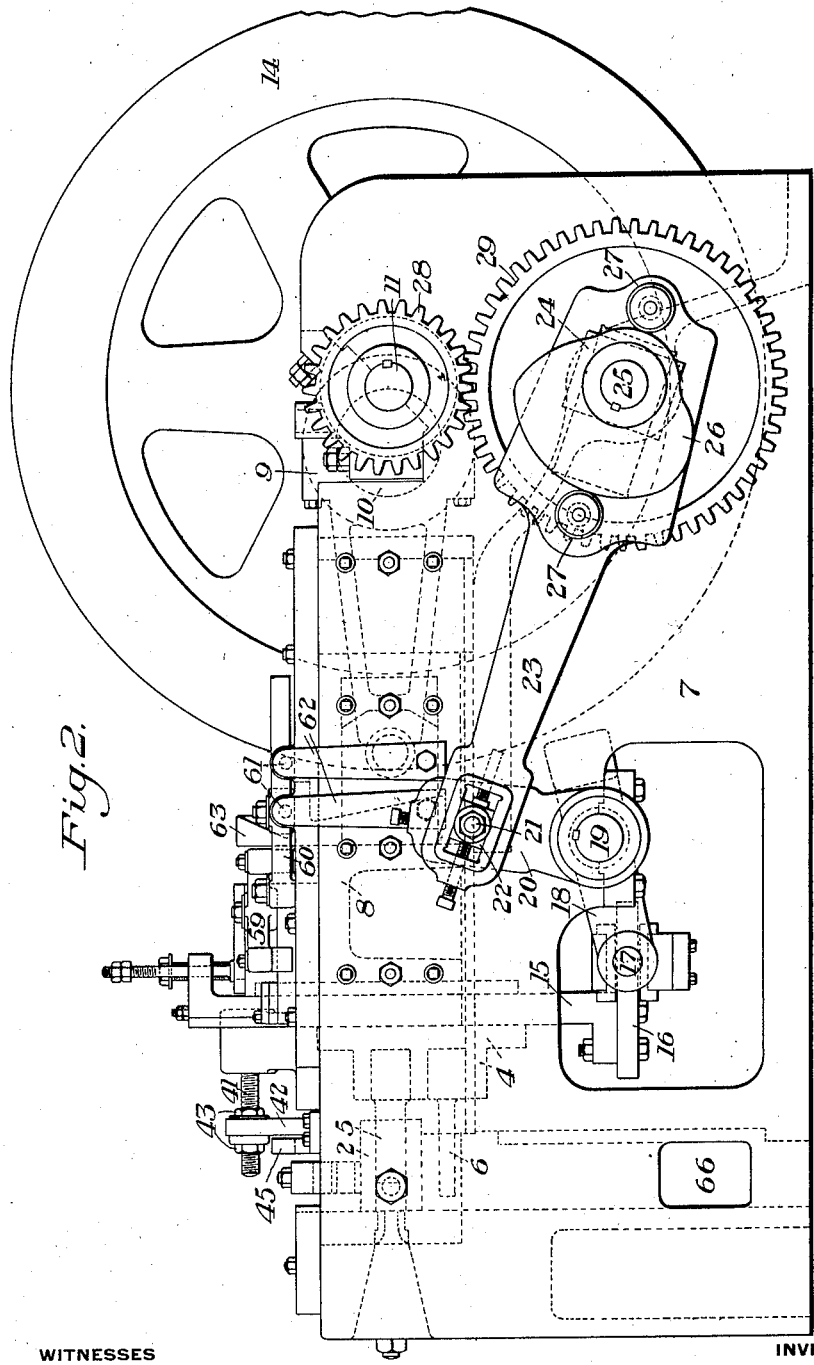
Fig. 2 is a side elevation.

Our invention relates to an improved apparatus for making nut blanks without scrap or waste material.

It is well known to those familiar with the art that nut blanks have been made in various ways, but in all such cases there has been a great deal of waste material or scrap which is not only a great loss in material, but necessitates considerable labor in handling the same.

By our apparatus we propose to upset a nut blank on the end of a rod or work piece and then pierce the blank and retain the pierced portion of the blank on the end of the bar, so that the portion which has been punched out of the blank will be used for making the next blank.

Another advantage of our invention is to provide a machine for carrying out the various steps in the manufacture of nut blanks, in which the holding and forming die operating mechanism is so arranged that the work piece will be held between the die members during the upsetting of the end of the work piece and retain the nut blank between the die members during the piercing of the blank and the withdrawal of the piercing punch. The mechanism is so arranged that the die members will separate if undue pressure is exerted upon the work piece which would tend to wreck the die and is also adapted to prevent the die members from being moved to their closed position if there is any obstruction between them, thereby avoiding injury to the die members and the mechanism.

The precise nature of our invention will be best understood by reference to the accompanying drawings which will now be described, it being premised, however, that various changes may be made in the details of construction and arrangement of the parts without departing from the spirit and scope of our invention, as defined in the appended claims.

In carrying out our invention by one type of apparatus, we use a pair of die members, one of which is movable relative to the other. The heated bar from which the blanks are made is moved between the two die members 2, such as shown in Figs. 11 to 14, against a movable stop 3, as shown in Fig. 11. The die members are then closed upon the work piece and the stop moved away from the end thereof. A tool holding member 4 is then advanced toward the stock and the upsetting tool 5 connected thereto engages the end of the stock and upsets it within the die members 2, as shown in Fig. 12. Any surplus material in the die will be forced rearwardly through the opening in which the bar is held. After the blank has been upset, the tool holder is moved rearwardly and is then elevated to bring a punch 6 connected thereto in line with the center of the blank, as shown in Fig. 13. The tool holder and punch are then advanced to pierce the blank and the plug which is removed from the opening in the blank is retained on the end of the work piece and are moved outwardly, as shown in Fig. 14, so that the plug is retained on the end of the stock and is utilized in making the next blank. After the punch has been withdrawn from the blank, the tool holder is lowered to the position shown in Fig. 11 for making the next blank, the die being opened to permit the formed blank to drop from the dies and permit the stock to be moved forward to form the next blank.

Referring to the apparatus for actuating these various members, 7 designates the frame of a nut machine having a reciprocating slide 8 movably mounted in guides on the frame 7. This slide is reciprocated by means of an eccentric rod 9 connected thereto and which is in turn actuated by an eccentric 10 on a crank shaft 11. Connected to the crank shaft 11 between collars 12 and 13 which are keyed to the crank shaft is a fly-wheel 14, for receiving the usual driving belt. Slidably mounted in guides on the end of the slide 8 is a tool holder slide 15 which is adapted to move vertically with relation to the slide 8. Connected to the lower end of the tool holder slide 15 is a foot member 16, which is slidably mounted in trunnions 17 in a yoke 18. The yoke 18 is mounted to oscillate in bearings in the main frame 7 and is provided with a shaft 19 extending to the outside of the frame of the machine. 20 is a crank arm connected to the shaft 19 having a crank pin 21 provided with a suitable sliding block 22 which is adjustably mounted in one end of a pitman 23, the other end of the pitman working on a guide block 24 on a stub shaft 25. The stub shaft 25 is provided with a cam 26 working between two anti-friction rollers 27 connected to the pitman 23. Connected to the crank shaft 11 is a gear wheel 28 which meshes with the gear wheel 29 on the stub shaft 25, the ratio of the gear wheel 28 to that of the gear wheel 29 is two to one, so that the pitman 23 will be reciprocated once for every two revolutions on the crank shaft. The reciprocation of the pitman 23 raises and lowers the tool holder slide on the end of the main slide 8 to first bring the upsetting tool 5 into alinement with the die members and then the punch 6, so that one nut blank will be made during each cycle of the machine. The tool holding member 4 is connected to the tool holder slide 15 by means of bolts 30, the connections being such that the tool holder can readily be removed and another tool holder having different size tools therein inserted in place.

The stationary die member 2ª is mounted in a suitable seat in the frame of the machine, in line with the upsetting tool and punch, while the movable die member 2ᵇ is arranged to be moved by a reciprocating slide block 33, mounted in guides in the frame 7, and which guides extend at right angles to the guides for the slide 8. The end of this slide block 33 is provided with a roller 34 which is engaged and moved in one direction (namely, the die-closing position) by means of a cam 35 on a shaft 36. This shaft 36 is rotated by bevel gears 37 and 38 from the crank shaft 11, the ratio of the gears being such that the shaft 36 is rotated once for every two reciprocations of the slide 8. The slide block 33 is normally retained in its retracted position, or the position in which the die members are separated by means of a spring 39 which is attached on one end of the lever 40 pivoted to the frame of the machine, the other end thereof being connected to the slide block 33.

Adjustably mounted on a screw rod 41 supported from a bracket on the main frame is a gage lever 42 which is arranged to be moved longitudinally relative to the die members by means of the adjusting nuts 43. Connected to one end of this gage lever 42 is a roller 44 which is actuated by a cam 45 on the slide block 33 to bring the end stop 3 on the gage lever in front of the dies 2ª and 2ᵇ. This cam 45 is merely arranged to lower the gage lever in front of the dies and is returned to its inoperative position by means of a spring 46 connected to an arm 47 on the gage lever.

In order to provide a relief for the dies to prevent the machine from being wrecked from undue pressure, we mount the movable die member 2ᵇ on a relief slide 48 which is slidably mounted in guides in the slide block 33. Connected to the relief slide 48 and the slide block 33 is a relief toggle comprising a lever 49 having a through pin, the ends of which are slidably mounted in slots 33ª in the sides of the slide block 33. 50 is a link connected to one end of the lever 49, the other end thereof being connected to the relief slide 48. 51 is a similar link connected to the slide block 33 and the other end of the lever 49. 52 is a plunger mounted in a guide in the slide block 33 and is arranged to be held in its outward position by means of a spring 53, the end of the plunger being connected to a projection 54 on one end of the lever 49. The arrangement is such that the toggle mechanism is normally held in its extended position, as shown in Fig. 4. 55 is an adjustable screw mounted in the slide block 33 and is arranged to position the centers of the pivot pins of the toggle mechanism to determine the pressure at which the toggle is operated to relieve the strains.

In order to lock the tool holding bar in its two positions, we provide a reciprocating lock bar 56 which is mounted in guides on the slide 8 having beveled edges at the front end thereof and which is arranged to be actuated by an arm 57 of a three-armed lever. The other arms 58 and 59 are provided with anti-friction rollers adapted to engage a spring-pressed cam 60, pivoted to the frame of the machine; the three-armed lever being pivoted to the slide 8 so that it is actuated by the cam 60 during reciprocation of the slide. The cam 60 is held against the rollers on the arms 58 and 59 of the three-armed lever by means of sliding plungers 61 which are actuated by the leaf springs 62.

In order to provide means for quickly releasing the slide 8 and disconnecting the actuating mechanism if for any reason the tools or slides should become jammed, we provide a wedge-key 63 which engages a working face on the slide 8 and a similar face on a bearing block 64, which is mounted in guides in the main slide, the key 63 being held in its locking position by means of a screw 65. If for any reason the slide or any of its mechanism becomes jammed, it is only necessary to slack the screw 65 and drive the key 63 downwardly which will disconnect the eccentric rod 9ª from the slide.

As before described, the main driving wheel 14 is frictionally connected to the crank shaft so that if for any reason undue pressure is exerted against the operating tools on the slide 8 or any of the other mechanism should jam, the wheel 14 will rotate about the crank shaft.

The operation of the machine is as follows:

Assuming the die members to be in their open position so that the roller 34 is in the low portion of the cam 35, the gage member will be moved downwardly to bring the stop in front of the die members. The work piece is then moved in between the dies against the stop 3. As the machine is rotated, the die member 2ᵇ will be moved toward the die member 2ª by means of the cam 35, and immediately after the work piece is gripped between the die members, the upsetting tool 5 will engage the end of the work piece and upset it between the die members. The slide 8 is then moved rearwardly, and the tool holding slide 15 is elevated by means of the cam 26 and the various mechanism operated by the pitman 23, which shifting takes place when the slide 8 is in its retracted position. During the return movement of the slide 8 the lock bar 56 is withdrawn by means of the three-armed lever, the roller on the arm 59 of said lever engaging the cam 60 to retract the lock bar. As the slide 8 is advanced, the lock bar is moved forward to bring the upper beveled edge under a similar beveled edge on the tool holding bar to positively position the punch 6 with relation to the center of the die members. As the slide 8 is advanced the punch 6 will pierce an opening in the nut blank and force the stock, together with the plug, outwardly through the die members. The slide 8 is then retracted to withdraw the punch and shortly after the punch is withdrawn the die member 2ᵇ is moved laterally to release the nut blank which will drop into the chute 66, and the work piece is advanced to provide stock to form the next blank.

The advantages of our invention result from the provision of an apparatus for making nut blanks from a heated bar in which the blank is first upset and is then pierced, the plug which is pierced from the opening in the blank being retained on the end of the stock and utilized in forming the next blank. By means of this apparatus we are able to form blanks without any scrap whatever, with the exception of the small end of the bar which is too small to be held by the die members.

Another advantage of our invention results from the provision of relief mechanism for the die members which will permit one die member to move relative to the other if the excess of material will not flow back through the opening between the die members, or if the material is so cold that it will not flow back through the die opening when the upsetting tool is advanced. The relief mechanism is also so arranged that it will be brought into action if there is any obstruction between the two die members.

We claim:

1. A device for the manufacture of nut blanks, comprising a two-part die, said die having a stock gripping portion and a nut blank forming portion, one of said parts being fixed, the other being movable with relation thereto, means to move one part of said die relative to the other to permit the stock to be fed therethrough and release a finished blank when moved in one direction, a reciprocating tool holder arranged to coact with the die to form the blank therein, means to reciprocate said tool holder with relation to the die and an upsetting tool on the tool holder arranged to form the nut blank in the die, a punch on the tool holder arranged to force the surplus material in the blank back through the blank, together with the stock, and means for moving said tool holder in a lateral direction with relation to the die to alternately bring the punch and upsetting tool in line with the die, substantially as described.

2. A device of the character described, comprising a die having two members, means in back of the die for holding the stock, means for moving one die member relative to the other to release the finished blank, a stock gage in front of the die, means actuated by the movable die member for moving said gage into and out of operative position, a reciprocating tool holder, means to reciprocate said tool holder with relation to the die, an upsetting tool on the tool holder for upsetting the stock in the die, a punch on the tool holder for removing the surplus stock from the opposite blank, and means for moving said tool holder in a lateral direction to alternately bring the punch and upsetting tool in line with the die, substantially as described.

3. A device for manufacturing nut blanks, comprising a die, a reciprocating slide, means to reciprocate said slide with relation to the die, a movable tool holder slide on the first slide having an upsetting tool and a punch thereon, an oscillating yoke, means for oscillating said yoke, a guide pivotally connected to the yoke and arranged to be oscillated therewith, and a guide member connected to the tool holder slide and in engagement with the oscillating guide on the yoke, arranged to reciprocate the slide to alternately bring the punch and upsetting tool in alinement with the die, substantially as described.

4. A device for manufacturing nut blanks, comprising a die, a reciprocating slide, means to reciprocate said slide with relation to the die, a movable tool holder slide on the first slide having an upsetting tool and a punch thereon, an oscillating yoke, means for oscillating said yoke, a guide pivotally connected to the yoke and arranged to be oscillated therewith, and a guide member connected to the tool holder slide and in engagement with the oscillating guide on the yoke, arranged to reciprocate the slide to alternately bring the punch and upsetting tool in alinement with the die, together with means for locking the tool holder slide in both positions, substantially as described.

5. A nut blank forming machine, having a combined stock holding and nut forming die, means for upsetting the end of the stock within the nut forming portion of the die, means to move one portion of said die relative to the other, and means in a different plane from said upsetting means to punch out the axial portion on the upset end to push the stock rearwardly through the die, substantially as described.

6. A forging machine having a die formed of a plurality of members, a slide block movable relative to one of said members, a relief slide movably mounted on the slide block and arranged to support one of the die members, means for reciprocating the slide block to move the one die member into operative position with relation to the other die member, and a relief mechanism connected to the relief slide and the slide block and arranged to permit the relief slide and the die member supported thereon to move relative to the slide block and the other die member; substantially as described.

7. A forging machine having a die formed of a plurality of members, a slide block movable relative to one of said members, a relief slide movably mounted on the slide block and arranged to support one of the die members, means for reciprocating the slide block to move the one die member into operative position with relation to the other die member, and a spring actuated toggle device connected to the relief slide and the slide block; substantially as described.

8. A forging machine having a die formed of a plurality of members, a slide block movable relative to one of said members, a relief slide movably mounted on the slide block and arranged to support one of the die members, means for reciprocating the slide block to move the one die member into operative position with relation to the other die member, a spring actuated toggle device connected to the relief slide and the slide block, and an adjusting screw for determining the position of the toggle device; substantially as described.

In testimony whereof we have hereunto set our hands.

FERDINAND MUMMELTHEY.
CHESTER H. HOLMES.

Witnesses:
ERNEST C. HARPER,
EDWARD J. DALY.